United States Patent Office 3,809,732
Patented May 7, 1974

3,809,732
PHOTO-LOCKING TECHNIQUE FOR PRODUCING INTEGRATED OPTICAL CIRCUITS
Edwin Arthur Chandross, Berkeley Heights, Coralie Anne Pryde, Morristown, Walter John Tomlinson III, Holmdel, and Heinz Paul Weber, Middletown, N.J., assignors to Bell Telephone Laboratories, Incorporated, Murray Hill, N.J.
Filed Dec. 18, 1972, Ser. No. 315,908
Int. Cl. G03c 5/16
U.S. Cl. 264—22                  7 Claims

ABSTRACT OF THE DISCLOSURE

A technique for the fabrication of integrated optical circuits and related optical devices in which a transparent polymer film, which is doped with a higher index photosensitive monomer, is deposited from liquid solution on a suitably smooth support. Depending upon the particular dopant selected, it attaches to the polymer, dimerizes or polymerizes upon selective exposure to radiation of appropriate wavelength, in each case resulting in substantial reductions or even total elimination of the mobility and volatility of the dopant in the polymer matrix. Selected portions of the dopant are thus photochemically locked in the polymer film. The unexposed portions of the dopant are removed from the film by simple heating. The exposed areas remain as selected regions of increased index and thickness suitable for guiding optical beams.

BACKGROUND OF THE INVENTION

This invention relates to techniques for making integrated optical waveguiding devices and related optical circuits.

Much recent work has been directed toward the fabrication of integrated optical circuits for use in future optical communication systems and other optical apparatuses. See, for example, volume QE-8 of the IEEE Journal of Quantum Electronics, p. 199 (1972). The simplest elements required for such circuits are dielectric waveguides, which consist of a transparent waveguiding core surrounded by transparent materials of lower indices of refraction. One can distinguish in the field between two fundamental classes of approaches to the fabrication of these waveguides.

In the first class, optical waveguides are typically formed by selectively applying a dielectric material onto a transparent substrate of lower refractive index. In this class are found techniques such as that described in volume 48 of the Bell System Technical Journal, p. 3445 (1969) wherein high quality waveguides are fabricated by the back-sputtering of optical glasses through a mask on lower index glass subtrates. A more recent approach in this class, generally referred to as "embossing" and described in detail in volume 20 of Applied Physics Letters, p. 143 (1972), employs thermoplastic substrates that are embossed with a metal die containing the pattern of the desired circuit and subsequently filled or coated with a polymerizable, higher index liquid monomer. Each of these approaches is relatively simple and well-suited for the inexpensive mass production of the desired devices. However, the devices fabricated according to these techniques are characterized by sharp, step-like transitions of refractive index between the different dielectric materials. This fact, combined with the presence of any roughness or irregularities in the material interfaces, can give rise to undesirably high scattering losses for optically guided waves.

In the second class of approaches, waveguides are typically formed by selectively altering the index of refraction of a bulk transparent material. Here one finds techniques such as the ion bombardment technique described in volume 11 of Applied Optics, p. 1313 (1972), wherein selected regions of increased refractive index are provided by selectively generating molecular disorder in a bulk sample. Also in this class are techniques in which selected regions of increased index are either photo-induced in suitably sensitized transparent polymeric samples, such as poly(methylmethacrylate), as described in volume 16 of Applied Physics Letters, p. 486 (1970), or electrically induced by diffusing a higher index dopant into a transparent material, as described in volume QE-8 of the IEEE Journal of Quantum Electronics, p. 545 (1972). In each of these approaches, the index transitions or profiles in the guides are smooth and gradual, rather than sharp. This fact eliminates, for the most part, the uneven dielectric interfaces responsible for high scattering losses in waveguides of the first class. Nevertheless, each of these approaches has inherent weaknesses. For example, in the ion bombardment technique, a trade-off is typically required between large index increases and low scattering losses. The photo-inducing technique, while typically featuring high spatial resolutions typically results in index changes that are relatively small. Finally, for the diffusion process, high resolution capabilities have yet to be reported.

SUMMARY OF THE INVENTION

Our present invention is based upon our discovery of a new and improved technique for the fabrication of integrated optical circuits, which eliminates some of the drawbacks typically encountered in the aforementioned classes of approaches and, at the same time, combines various desirable features thereof.

The method of our invention, referred to hereinbelow as "photo-locking," allows one selectively to alter the refractive index and/or thickness of a transparent polymeric sample to produce dielectric waveguides, optical gratings, and other devices which are embedded or fixed in the inert surroundings of the sample.

In an illustrative method of our invention, a polymer film, doped with a higher index photosensitive monomer, is first deposited from liquid solution upon a suitable support surface. The dopant monomer is selected so that it is moderately volatile and undergoes molecular structural change upon exposure to radiation of appropriate wavelength. Depending upon the particular dopant selected, it attaches to the polymer of the film, dimerizes or polymerizes upon selective irradiation, in each case resulting in substantial reductions or even complete elimination of the mobility and volatility of the dopant in the polymer matrix. Selected portions of the higher index dopant are thus photochemically locked in the polymer film. Simple heating is then employed to evaporate the remaining unexposed dopant. The heating step leaves the exposed dopant material in position in the film and has two consequences: first, the refractive index of the exposed area of the sample is intermediate between that of the starting polymer sample and that of the dopant monomer itself; and, secondly, the thickness of the polymer film in the unexposed areas of the sample is reduced due to the removal of the unexposed dopant.

An attractive feature of the illustrative method of an invention is the formation of devices which have smooth index and thickness profiles between different dielectric regions, a feature that is important in minimizing scattering losses for guided optical waves. In addition, high spatial resolutions, limited only by the wavelength of the exposing radiation, are possible. These features, combined with the relative simplicity and economy of the method and materials required for its implementation, make photo-locking quite promising for use in the fabrication of optical circuit devices.

BRIEF DESCRIPTION OF THE DRAWING

A more complete understanding of the foregoing and other features of our invention can be obtained from the following detailed description taken in conjunction with the accompanying drawing in which.

DETAILED DESCRIPTION

Figure 1:
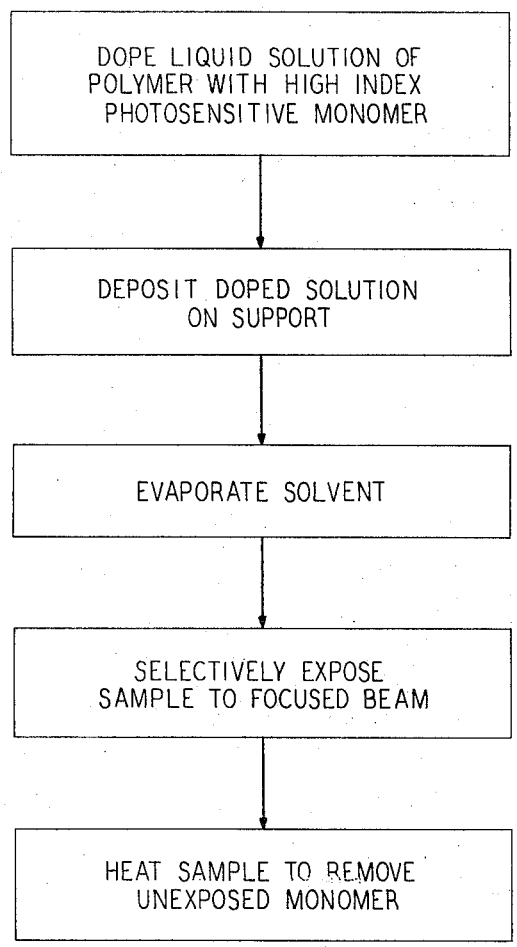
FIG. 1 is a block diagrammatic flow chart of the basic steps involved in an illustrative photo-locking method according to our invention.

As shown in the block diagrammatic flow chart of FIG. 1, the first step in the illustrative photo-locking method for fabricating optical circuits involves the preparation of a liquid solution of a transparent polymer in a solvent, and the doping thereof with a suitable high index photosensitive monomer. The solution of the polymer is prepared in the manner generally employed in conventional thin film solution-deposition techniques. See, for example, an article by R. Ulrich and H. P. Weber in volume 11 of Applied Optics, p. 428 (1972). The polymer is selected to be a good optical material, i.e., substantially homogeneous and substantially transparent in the visible region of the electromagnetic spectrum. The solvent is selected to be moderately volatile, so that evaporation thereof takes place during deposition relatively slowly. Slow evaporation has been found to be important in providing smooth, uniform, defect-free solution-deposited films. The initial concentration of the polymer in the solution may vary dependent upon intended application. Generally, the greater the polymer concentration and the higher the molecular weight of the polymer (hence viscosity of the solution), the greater the final thickness of the deposited film.

The liquid solution of polymer is next uniformly doped with a suitable higher index photosensitive monomer material. The monomer material is selected so that it undergoes one or more of the following molecular transformations upon irradiation with radiation of appropriate wavelength. Generally, in order of increasing number of molecules involved in the reaction, they are:

1. Attachment of the monomer to the polymer;
2. Dimerization of the monomer; and
3. Polymerization of the monomer.

Any of these radiation-induced molecular transformations results in substantial reductions in the mobility and volatility of the doping monomer species in the polymer matrix. Selected portions of the higher index dopant are thus capable of being photochemically "locked" or fixed in the polymer films.

The refractive index of the photosensitive monomer is typically chosen to be as much as possible above that of the polymer in the solution. In general, the refractive index will be the highest for those monomer materials which contain polycyclic aromatic hydrocarbon nuclei or heavy atoms having high polarizability. The presence of such groups in the molecular framework of the dopant monomer increases its molecular weight and consequently decreases its volatility. Generally, the greater the dopant level or concentration in the solution, the greater the increases in refractive index and thickness obtainable according to the illustrative method of the invention. Dopant levels in the area of 10 to 50 percent by weight are typical.

Figure 2A:
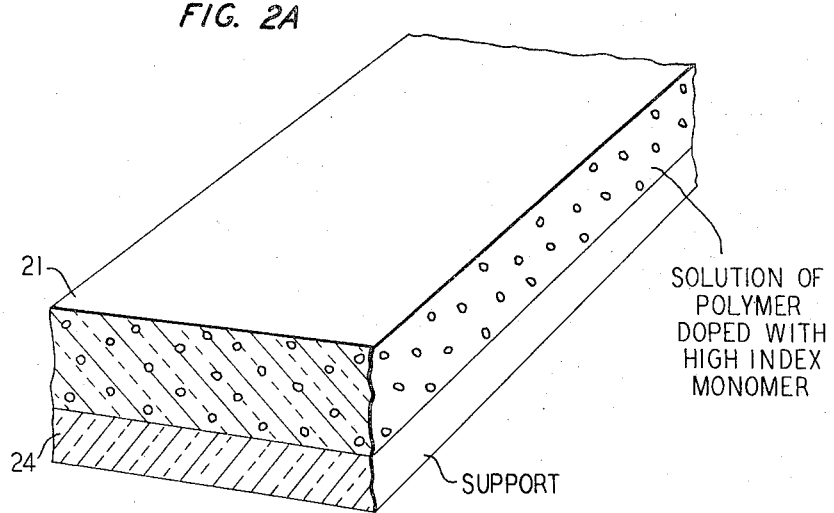
FIGS. 2A through 2D show structures that are related to the performance of the steps of FIG. 1.

As indicated by the next step in the flow chart of FIG. 1 and as illustrated by FIG. 2A of the drawing, film 21 of the doped liquid solution is next deposited on a substantially smooth support 24. The support may be a common glass microscope slide or Pyrex plate. Careful cleaning of the support surface before depositing the solution is useful in removing any dust or other foreign matter that might adversely affect the film quality. The doped solution can be simply poured on support 24 using a syringe until the whole support surface is flooded. Tilting the support in a vertical position allows any excess solution to drip off the support.

Alternative techniques for depositing the doped liquid solution on support 24, which techniques provide more effective control over the uniformity and thickness of the deposited film, are described or referenced in the above-cited article of R. Ulrich and H. P. Weber. The particular depositing technique selected depends, at least in part, upon the precision desired in the final fabricated device. A trade-off is typically made between precision and ease of fabrication.

Figure 2B:
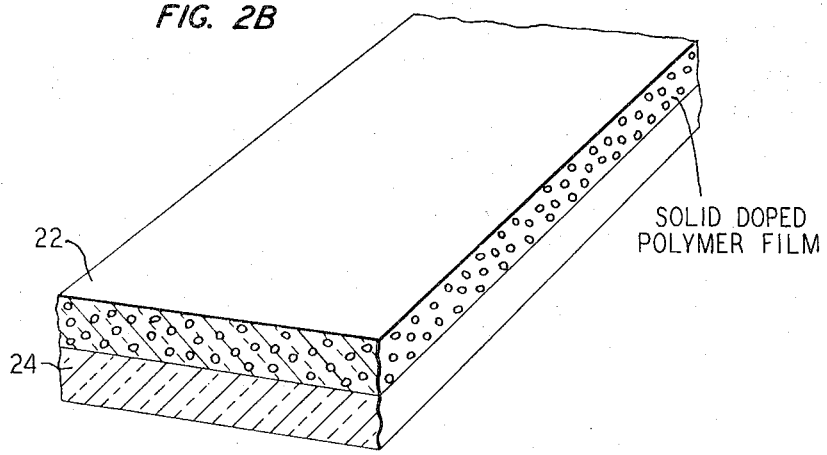

Once the doped solution is deposited on support 24, the solvent in the solution is evaporated. As illustrated in FIG. 2B of the drawing, a solid, doped polymer film 22 of uniformly reduced thickness results on support 24. Evaporation of the solvent is illustratively carried out at or near room temperature and may be air-aided. As indicated previously, however, evaporation should proceed slowly, particularly during the initial stages of drying. During this period, the solution is still sufficiently liquid so that it can flow under the influence of its own surface tension, which action tends to level all small-scale irregularities in the film profile.

The next step in the fabrication of the optical circuit is the exposing step. In this step, the desired optical circuit pattern is written in film 22 using focused beam of radiation of a wavelength to which the dopant monomer is intended to respond. The implementation of the step is illustrated with the aid of FIG. 2C of the drawing.

It should be apparent that the desired device in the illustrated case is a simple optical waveguide consisting of an elongated high index region embedded in the central portion of film 22. The high index region accordingly extends backward along the line of sight in FIG. 2C. It may also be bent or curved within the plane of film 22, depending upon the particular configuration of the circuit desired.

Selectively exposing film 22 selectively induces the desired molecular structural transformation in the dopant species. The transformation, whether it be an attachment of the monomer to the polymer in film 22, a dimerization of the monomer, or a polymerization of the monomer, results in substantial reductions or even complete elimination of the mobility and volatility of the exposed material in the polymer matrix. For example, if attachment takes place, the monomer molecules actually become chemically bonded to molecules in the long polymer chains at various random points. Dimerized molecules are generally much more bulky in structure than their corresponding monomers and thus readily become tangled or intertwined in the long, flexible molecular chains of the polymer. Likewise, the monomer molecules, when polymerized, form long, flexible, randomly arranged chains which become tangled very easily with the molecular chains of the polymer matrix. It is noted that with some dopant monomer materials and with some polymer materials more than one of the above-listed molecular transformations can take place simultaneously upon exposure. In any case, the higher index dopant monomer is photochemically locked in the polymer film 22 in the pattern of the desired optical circuit.

Figure 2C:
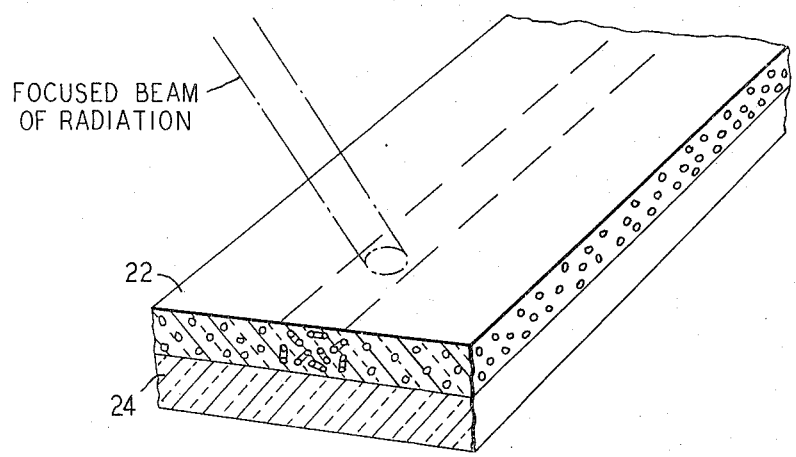

In the exposing step, it appears desirable to focus the beam as sharply as possible, or at least to a degree that the desired refractive index variation across film 22 will be provided by the cross-sectional characteristics of the beam. Generally, the greater the intensity of the incident light, the greater the number of monomer molecules that become locked in the polymer, and therefore the greater the index change and final thickness of the exposed region. The cross-sectional diameter and axial extent of the beam in the film can be adjusted by varying the angle of incidence or convergence of the beam. Thus, if a waveguide of width larger than that shown in FIG. 2C is desired, the angle of incidence or convergence of the beam can be decreased so that the beam diameter at the film increases.

Preferably, the wavelength of the exposing beam is selected to initiate efficiently the desired molecular transformation in the monomer while, at the same time, to have no appreciable effect on the polymer in the film. The particular wavelength employed accordingly depends upon the particular monomer and polymer materials used as starting materials in each case. In no case should the wavelength be such as to dissociate the constituents of the film or otherwise deleteriously affect the quality of the resulting devices.

It should be understood that, although the illustrated case shows a simple elongated waveguide being exposed, many more complex exposure arrangements are possible. For example, two coherent exposing beams can be made to intersect to provide a beam intensity interference pattern that spatially varies in the film in a periodic fashion. Such an arrangement can be employed for exposing optical gratings in film 22 consisting of alternately spaced regions of high and low refractive indices and film thicknesses. As will be recognized by those skilled in the art, such gratings are useful for a number of purposes in integrated optical devices. Likewise, exposure of the film in the photo-locking method of an invention can be through a mask which contains the desired optical circuit pattern in the form of localized regions of high transmission of the exposing beam (i.e., holes in an otherwise opaque mask). Such masking techniques are well known and typically employed in the fabrication of semiconductor devices using photoresist materials. For a detailed discussion of various exposure arrangements directly applicable to the method of our invention, reference is made to U.S. Pat. No. 3,689,264, issued Sept. 5, 1972, which describes a related scheme for fabricating optical circuits involving exposure to a focused beam.

The final step in the flow chart of FIG. 1 involves the development of the exposed circuit pattern in film 22. Development is carried out by simple heating of the film to evaporate the unexposed portion of the dopant. This step leaves the exposed portions of the dopant in position in the film and has two consequences: first, the refractive index of the exposed portions of film 22 is intermediate between that of the original polymer and that of the dopant material itself; and, secondly, the thickness of film 22 is reduced in the unexposed regions thereof due to removal of the unexposed dopant. A structure of the type illustrated in FIG. 2D of the drawing results.

The maximum temperature for development is limited by the various physical and chemical properties of the particular dopant species and the particular polymer employed in the method. Considerations in this regard are the glass transition temperature of the polymer material, temperature-induced diffusion of the locked-in dopant in the polymer matrix and the rates of thermally-induced undesirable chemical changes in the materials. Development should be carried out at temperatures for which these effects insignificantly affect the desired quality of the resulting devices. For these reasons, the monomer is preferably moderately volatile, so that development can take place at reasonable temperatures.

Figure 2D:
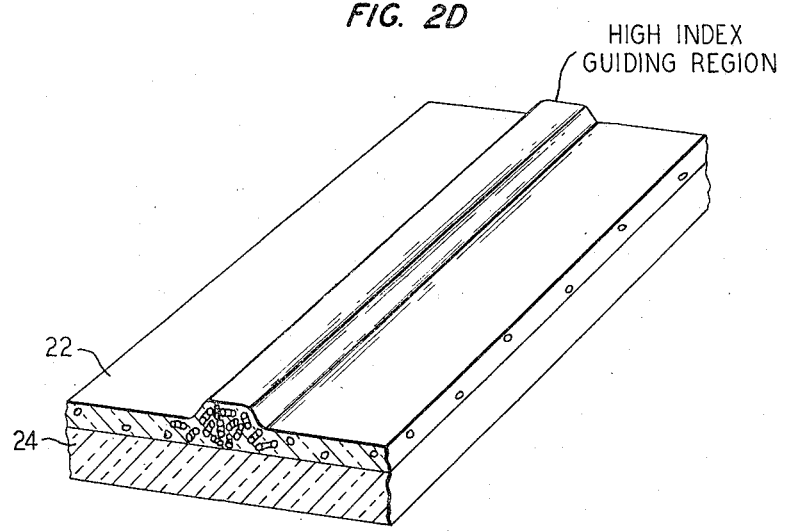

As can be appreciated from the illustration of FIG. 2D, an attractive feature of photo-locking is the production of integrated optical circuits having smooth index and thickness profiles between different dielectric regions in the devices. Generally, a very smooth and axially symmetrical transverse variation of refractive index and thickness corresponding very closely to the cross-sectional variation of intensity in the exposing beam is obtained. The concentration of the locked-in higher index dopant is typically maximum along the axis of the exposing beam and generally decreases away from the axis. Additionally, the thickness of film 22 after development is generally proportional to the concentration of the locked-in dopant therein. These features eliminate, for the most part, the edge roughness often responsible for high scattering losses in optical circuits fabricated by alternative prior art techniques.

In addition, the spatial resolution that has been experimentally obtained with photo-locking to date is at least better than about 5 microns. The ultimate resolution inherent in the photo-locking technique of our invention, of course, depends upon a number of factors, including the diffusion of the dopant in the polymer matrix during development, the molecular shape and volume of the dopant species and the particular characteristics of the polymer. We are continuing our experiments in an effort to make a detailed study of the exact effect of these factors on resolution. Our present understanding, however, is that, at least with some dopant and polymer materials, spatial resolutions in photo-locking are only diffraction-limited by the wavelength of the exposing radiation.

Employing the illustrative method of FIG. 1, we have experimentally demonstrated that very fine optical waveguides and optical gratings can be written inside a polymer film by focusing the exposing beam and, in some cases, translating it or the sample along a desired path. We have experimented with all three of the radiation-induced monomer transformations for photo-locking listed hereinabove. To date, dimerization of the monomer has yielded the best results and we describe in detail an example using this approach.

We started by preparing a liquid solution including xylene, as the solvent, and poly(methylmethacrylate), a well-known transparent polymer having an index of refraction of about 1.49. The liquid solution was doped to contain about 25 percent (by weight) of ethyl 2-(1-naphthyl)acrylate, a photosensitive ester capable of dimerization upon exposure to radiation in the near ultraviolet portion of the spectrum. The photochemical reaction that forms the dimer is of the type:

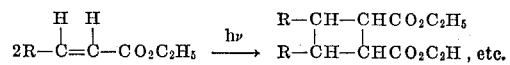

where R is the naphthyl group ($C_{10}H_7$). The inherent refractive index of these dimers is probably in the range of 1.58–1.60.

The doped liquid solution was then deposited on smooth, clean Pyrex plates and the solvent evaporated. Final thicknesses of the solid, doped polymer film were about 2–3 microns.

The film was next exposed to a beam of radiation from an argon ion laser having a wavelength of 0.3638 micron, a cross-sectional diameter at the film of about 2 microns, and a power of about 15 microwatts. The beam was held stationary and the sample translated longitudinally at a velocity of 250 microns per centimeter to produce a simple strip optical waveguide. From the change of the absorption spectrum of the material in the near ultraviolet, we concluded that we dimerized about 75 percent of the ester in the region of the film exposed by the beam. If we could then evaporate all of the remaining undimerized ester from the film, the maximum difference in index between the exposed and unexposed regions would be about 1.3 percent. In practice, however, heating at about 90–95° C. for one hour failed to evaporate all of the unreacted ester from the film. At the dopant concentration used in these experiments (25 percent), we nevertheless achieved, after development, an index difference of about 0.8 percent, a value that is regarded as desirable for most waveguides with relatively sharp bends. The value of the index difference was not changed significantly by longer development (heating) times.

The refractive indices of the exposed and unexposed areas of the film were determined by coupling an optical beam into the film using a prism film coupler and measuring the synchronous angles. (See volume 14 of Applied Physics Letters, p. 291 (1969), for an explanation of this measurement technique.) We measured the losses in the films by coupling a beam from a 0.6328 micron helium-neon laser into the films using a prism film coupler and coupling the beam out of the film by sliding along the propagation direction of the beam a prism riding on the upper surface of the film on a thin layer of index matching fluid. In the unexposed and undeveloped portions of the film, we measured a loss of about 0.12 DB per centimeter. Exposed and undeveloped portions showed a loss of about 0.1 DB per centimeter, whereas exposed and developed portions of the film showed a loss of about 0.32 DB per centimeter. All of these values compared favorably with the best loss values obtained by alternative prior art techniques.

An investigation of the exposed and developed portions of the films with a Leitz transmission interference microscope showed that the elongated optical guides produced were less than 5 microns wide. We coupled light (0.6328 micron) into these guides using a microscope objective and a prism film coupler. From the light scattered out of the guides, we were able to confirm a guide width of less than 5 microns. Using the technique described above, we again measured losses of about 0.3 DB per centimeter in the guides.

No deterioration in the waveguides produced by photo-locking was observed on standing over a period of more than a month at room temperature. The scattering losses do not appear to change on standing and diffusion of the locked-in dopant species seems to be negligible.

Similar photo-locking experiments were carried out using, in one case, photosensitive monomers which chemically attach to the polymer in the film and, in another case, monomers which polymerize upon exposure.

To illustrate the use of the attachment approach to photo-locking, two different types of attachment reactions were employed. The first reaction involved the use of high index carbonyl compounds (e.g., benzophenone) as the photosensitive dopant. The carbonyl compounds, when irradiated, typically abstract hydrogen atoms from the polymer chain in solution and attach to it in the following manner:

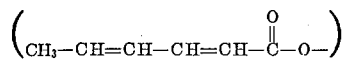

Upon exposure, the carbonyl compounds usually do not dimerize or otherwise react with themselves. Other types of attachment reactions may occur with carbonyl compounds, however, if carbon-carbon double bonds are present in the polymer chain. In any event, the compounds tend to become locked to the polymer by actual chemical attachment.

In order to increase the efficiency of the incorporation of the benzophenone in our experiments, we used a polymer from the methacrylate family with crotonate side groups

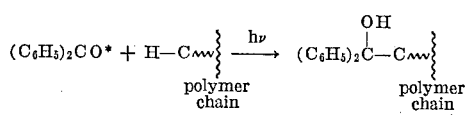

In particular, a liquid solution of a copolymer of methyl methacrylate and glycidyl methacrylate which had been reacted with crotonic acid was doped with benzophenone (23% by weight) and a film of the materials was solution-deposited on a support in the manner described hereinabove. Part of the doped film was exposed to ultraviolet light from a mercury arc-lamp filtered through a Pyrex plate. After thermal development, the refractive index in the exposed areas of the film was greater by about 0.3 percent than that of the unexposed portions of the film. We found that higher index changes could be obtained in these experiments by using carbonyl compounds with substituents which are more polarizable than phenyl. For example, when a film prepared from the above-mentioned crotonate polymer doped with 1-acetonaphthone (27%) was selectively irradiated with light of λ≥300 nm. and then thermally developed. The index in the exposed area was 0.9% higher than that in the unexposed regions of the film.

Another type of reaction, a Diels-Alder reaction, was used to illustrate the attachment approach to photolocking. The polymer used was similar to that described above in the benzophenone arrangement but, instead of the crotonate side groups, it contained sorbate side groups of the form

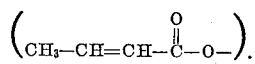

The high index photosensitive dopant was acenaphthylene. The reaction resulting in the locking of the donant in the polymer is of the type:

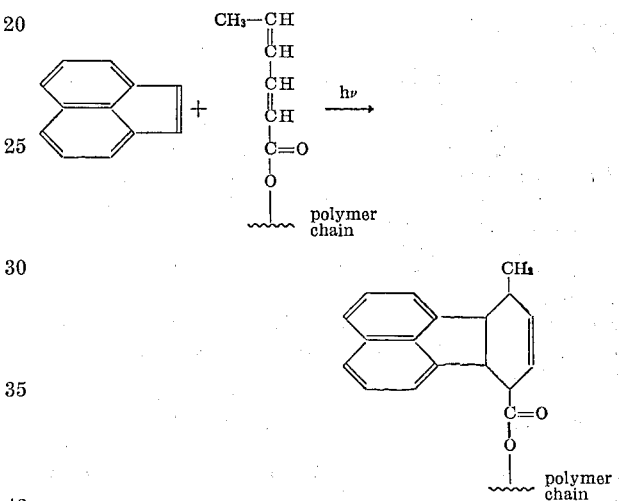

where the symbol

represents a benzene ring. Acenaphthylene does dimerize but this did not happen in our experiment with the material. We came to this conclusion basically because irradiation of the exposed area of the films with 254 nm. light had no effect thereon. The acenaphthylene dimer is efficiently dissociated to monomer by this treatment in other polymer films.

A film of sorbate polymer doped with acenaphthylene (20% by weight), irradiated with a beam from a mercury arc-lamp (λ≥300 nm.) and thermally developed in the manner described hereinabove showed a 1.8 percent increase in refractive index over similarly treated unexposed areas of the film.

To illustrate the use of the polymerization approach to photolocking, liquid solutions containing poly(methyl methacrylate) were prepared. The solutions were doped with the high index monomer naphthyl methacrylate (27% by weight) and benzoin methyl ether as a photosensitizer. By the addition of the photosensitizer, the naphthyl methacrylate monomer was thus made capable of ploymerizing upon exposure to ultraviolet radiation. In the experiments, a portion of the films was exposed to ultraviolet light from a mercury arc-lamp and the entire film was then subsequently heated. The refractive index in the irradiated areas of the film was about 1.5 percent higher than that in the unexposed regions of the film.

Various modifications of the above-described illustrative techniques will be realized by those skilled in the art without departing from the scope of the invention. For example, photo-locking can be carried out using, in lieu of a photosensitive dopant species, an unreactive high index dopant species which is locked by the cross-linking of the polymer which contains it. In such an arrangement, the polymer material is the material which responds to the incident radiation rather than the high index dopant. Thus, one could prepare a film of a photosensitive polymer, such as a photoresist with cinnamate or cinnamylidene side groups, and dope the film with an inert higher index material such as N-ethylcarbazole. Preferably, the dopant in the film will also serve as a photosensitizer for the polymer. As in the various approaches described hereinabove, selective cross-linking of the polymer in response to the incident radiation substantially decerases the mobility of the dopant species in the polymer matrix. While in the exposed areas of the film the dopant is locked, the dopant in the unexposed areas can be removed by simple heating.

In addition, while we have discussed hereinabove only the use of high index dopants to provide selected regions of increased index in the films, it should be noted that one can also photo-lock low index dopants in higher index polymer films, should this be desirable. Likewise, dopants of substantially the same index as that of the polymers could be employed if one is interested in obtaining only the thickness profiles provided by photo-locking. Such an approach would be useful in the fabrication of tapered optical films or of gratings comprised simply of periodic variations in the film thickness.

Furthermore, it should be noted that the exposing step in the illustrative method of our invention could be carried out by bombarding the films with a beam of high velocity particles such as electrons, ions, neutrons, etc. rather than by exposure to light. At least for some starting materials, particle irradiation might be of advantage in achieving higher spatial resolutions.

What is claimed is:

1. A method of making optical waveguiding devices and related optical circuits comprising the steps of doping a liquid solution of a transparent polymer in a solvent with a photosensitive monomer of higher index of refraction than that of said polymer, said monomer being capable of subsequent molecular structural change tending to lock said monomer in said polymer upon exposure to a beam of electromagnetic radiation of a selected wavelength range, depositing a film of said doped liquid solution on a substantially smooth support, evaporating said solvent from said solution, selectively exposing said film to said beam of radiation of said selected wavelength range to lock said monomer in selected portions of said film, and heating said film to remove the unexposed monomer from said film.

2. The method of claim 1 in which said monomer of said doping step is capable of chemically attaching to said polymer in said film upon exposure to said beam of radiation.

3. The method of claim 1 in which said monomer of said doping step is capable of dimerizing upon exposure to said beam of radiation.

4. The method of claim 1 in which said monomer of said doping step is capable of polymerizing upon exposure to said beam of radiation.

5. The method of claim 1 in which said exposing step comprises focusing said beam to a small cross-sectional diameter in said film and translating said film axially with respect to said beam in a continuous manner to form an elongated region of elevated index and thickness in said film suitable for guiding an optical beam.

6. The method of claim 1 in which said exposing step comprises interfering said beam of said radiation with a second beam of radiation of said selected wavelength range to provide a pattern of periodic intensity variations in said film to form regions therein of alternating high and low index.

7. The method of claim 1 in which said exposing step comprises directing said beam of said radiation through a mask onto said film, said mask containing the desired high index pattern in the form of localized regions of high transmission of said beam.

References Cited

UNITED STATES PATENTS

| | | | |
|---|---|---|---|
| 2,480,749 | 8/1949 | Marks | 264—22 |
| 3,372,100 | 3/1968 | Charlesby et al. | 204—159.16 |
| 3,689,264 | 9/1972 | Chandross et al. | 96—35.1 |
| 3,740,362 | 6/1973 | Gaylord | 204—159.16 |
| 3,761,280 | 9/1973 | Wolff et al. | 96—35.1 |

OTHER REFERENCES

Ulrich, R. and Weber, H.P., Solution-Deposited This Films and Active Light-Guides, Applied Optics, vol. 11, No. 2, February 1972, pp. 428–434.

ROBERT F. WHITE, Primary Examiner

G. AUVILLE, Assistant Examiner

U.S. Cl. X.R.

96—35.1; 204—159.16; 264—216